US008174357B2

(12) United States Patent
Geerlings et al.

(10) Patent No.: US 8,174,357 B2
(45) Date of Patent: May 8, 2012

(54) SYSTEM AND METHOD FOR TRAINING A TRANSMITTER TO CONTROL A REMOTE CONTROL SYSTEM

(75) Inventors: Steven L. Geerlings, Holland, MI (US); Loren D. Vredevoogd, Holland, MI (US); David A. Blaker, Holland, MI (US); John D. Spencer, Allendale, MI (US)

(73) Assignee: Johnson Controls Technology Company, Holland, MI (US)

( * ) Notice: Subject to any disclaimer, the term of this patent is extended or adjusted under 35 U.S.C. 154(b) by 1285 days.

(21) Appl. No.: 10/531,108

(22) PCT Filed: May 20, 2004

(86) PCT No.: PCT/US2004/015886

§ 371 (c)(1),
(2), (4) Date: Mar. 21, 2006

(87) PCT Pub. No.: WO2004/104966

PCT Pub. Date: Dec. 2, 2004

(65) Prior Publication Data

US 2006/0217850 A1 Sep. 28, 2006

Related U.S. Application Data

(63) Continuation-in-part of application No. PCT/US03/35641, filed on Nov. 7, 2003, and a continuation-in-part of application No. PCT/US2004/005257, filed on Feb. 23, 2004.

(60) Provisional application No. 60/472,049, filed on May 20, 2003, provisional application No. 60/424,989, filed on Nov. 8, 2002, provisional application No. 60/448,993, filed on Feb. 21, 2003.

(51) Int. Cl.
*B60R 25/00* (2006.01)

(52) U.S. Cl. ........................ 340/5.7; 340/5.61; 340/3.21

(58) Field of Classification Search ............. 340/825.22, 340/5.61, 5.64, 5.62, 825.69, 3.21, 825.72; 341/176; 701/2
See application file for complete search history.

(56) References Cited

U.S. PATENT DOCUMENTS 4,529,980 A 7/1985 Liotine et al.
(Continued)

FOREIGN PATENT DOCUMENTS

EP 1 052 608 A1 11/2000
(Continued)

OTHER PUBLICATIONS

International Search Report for PCT/US 2004/015886 mailed Oct. 12, 2004, 3 pages.

(Continued)

*Primary Examiner* — Vernal U Brown
(74) *Attorney, Agent, or Firm* — Foley & Lardner LLP

(57) ABSTRACT

A method for training a trainable RF transmitter to transmit variable code signals used to actuate a remote device having a receiver where the transmitter includes a memory that has stored variable code characteristics for a plurality of different remote devices includes initiating a training sequence and generating at least one RF carrier signal having the variable code characteristics associated with one remote device of the plurality of different remote devices. The method further includes transmitting the at least one RF carrier signal to the receiver of the remote device and repeating the generating and transmitting steps for the variable code characteristics of each remote device in the plurality of different remote device until feedback is received from a user that the remote device is activated. Upon receiving an indication that the remote device is activated, the transmitter stores an identifier of the variable code characteristics that activated the remote device.

5 Claims, 9 Drawing Sheets

U.S. PATENT DOCUMENTS

| | | | | |
|---|---|---|---|---|
| 4,535,333 | A | 8/1985 | Twardowski | |
| 4,750,118 | A | 6/1988 | Heitschel et al. | |
| 4,866,434 | A | 9/1989 | Keenan | |
| 4,931,789 | A | 6/1990 | Pinnow | |
| 4,988,992 | A | 1/1991 | Heitschel et al. | |
| 5,379,453 | A | 1/1995 | Tigwell | |
| 5,442,340 | A | 8/1995 | Dykema | |
| 5,475,366 | A | 12/1995 | Van Lente et al. | |
| 5,479,155 | A | 12/1995 | Zeinstra et al. | |
| 5,563,600 | A * | 10/1996 | Miyake | 341/173 |
| 5,583,485 | A | 12/1996 | Van Lente et al. | |
| 5,596,316 | A | 1/1997 | Honeck | |
| 5,614,885 | A | 3/1997 | Van Lente et al. | |
| 5,614,891 | A | 3/1997 | Zeinstra et al. | |
| 5,614,906 | A * | 3/1997 | Hayes et al. | 341/176 |
| 5,619,190 | A | 4/1997 | Duckworth et al. | |
| 5,627,529 | A | 5/1997 | Duckworth et al. | |
| 5,646,701 | A | 7/1997 | Duckworth et al. | |
| 5,661,651 | A | 8/1997 | Geschke et al. | |
| 5,661,804 | A | 8/1997 | Dykema et al. | |
| 5,680,134 | A | 10/1997 | Tsui | |
| 5,686,903 | A | 11/1997 | Duckworth et al. | |
| 5,699,054 | A | 12/1997 | Duckworth | |
| 5,699,055 | A | 12/1997 | Dykema et al. | |
| 5,708,415 | A | 1/1998 | Van Lente et al. | |
| 5,758,300 | A | 5/1998 | Abe | |
| 5,774,064 | A | 6/1998 | Lambropoulos et al. | |
| 5,790,948 | A | 8/1998 | Eisfeld et al. | |
| 5,793,300 | A | 8/1998 | Suman et al. | |
| 5,810,420 | A | 9/1998 | Welling | |
| 5,841,390 | A | 11/1998 | Tsui | |
| 5,844,473 | A | 12/1998 | Kaman | |
| 5,854,593 | A | 12/1998 | Dykema et al. | |
| 5,903,226 | A | 5/1999 | Suman et al. | |
| 5,926,087 | A | 7/1999 | Busch et al. | |
| 5,990,828 | A | 11/1999 | King | |
| 5,995,898 | A | 11/1999 | Tuttle | |
| 6,005,508 | A | 12/1999 | Tsui | |
| 6,008,735 | A | 12/1999 | Chiloyan et al. | |
| 6,020,829 | A | 2/2000 | Hormann | |
| 6,021,319 | A | 2/2000 | Tigwell | |
| 6,023,241 | A | 2/2000 | Clapper | |
| 6,055,468 | A | 4/2000 | Kaman et al. | |
| 6,072,404 | A | 6/2000 | Nolan et al. | |
| 6,078,271 | A | 6/2000 | Roddy et al. | |
| 6,091,330 | A | 7/2000 | Swan et al. | |
| 6,091,343 | A * | 7/2000 | Dykema et al. | 340/825.69 |
| 6,127,922 | A * | 10/2000 | Roddy et al. | 340/426.14 |
| 6,127,961 | A | 10/2000 | Stacy et al. | |
| 6,131,019 | A | 10/2000 | King | |
| 6,137,421 | A | 10/2000 | Dykema | |
| 6,144,114 | A | 11/2000 | Chutorash | |
| 6,154,148 | A | 11/2000 | Fluharty et al. | |
| 6,160,319 | A | 12/2000 | Marougi et al. | |
| 6,181,255 | B1 | 1/2001 | Crimmins et al. | |
| 6,188,889 | B1 | 2/2001 | Tsai | |
| 6,191,701 | B1 | 2/2001 | Bruwer | |
| 6,249,673 | B1 | 6/2001 | Tsui | |
| 6,265,987 | B1 | 7/2001 | Wang et al. | |
| 6,271,765 | B1 | 8/2001 | King et al. | |
| 6,271,815 | B1 | 8/2001 | Yang et al. | |
| 6,275,379 | B1 | 8/2001 | Quinno et al. | |
| 6,308,083 | B2 | 10/2001 | King | |
| 6,333,698 | B1 | 12/2001 | Roddy | |
| 6,337,173 | B2 | 1/2002 | Jen et al. | |
| 6,377,173 | B1 * | 4/2002 | Desai | 340/426.36 |
| 6,396,408 | B2 | 5/2002 | Drummond et al. | |
| 6,426,706 | B1 | 7/2002 | King | |
| 6,472,885 | B1 | 10/2002 | Green et al. | |
| 6,486,795 | B1 | 11/2002 | Sobel et al. | |
| 6,512,461 | B1 | 1/2003 | Benzie et al. | |
| 6,525,645 | B2 | 2/2003 | King et al. | |
| 6,556,681 | B2 | 4/2003 | King | |
| 6,556,813 | B2 * | 4/2003 | Tsui | 455/92 |
| 6,559,775 | B1 | 5/2003 | King | |
| 6,593,856 | B1 * | 7/2003 | Madau | 340/12.27 |
| 6,703,941 | B1 | 3/2004 | Blaker | |
| 6,724,339 | B2 | 4/2004 | Conway et al. | |
| 6,747,568 | B1 * | 6/2004 | Teskey | 340/825.72 |
| 6,822,603 | B1 | 11/2004 | Crimmins et al. | |
| 7,050,794 | B2 | 5/2006 | Chuey et al. | |
| 7,254,182 | B2 | 8/2007 | Tsui | |
| 2001/0007086 | A1 | 7/2001 | Rogers et al. | |
| 2001/0035811 | A1 | 11/2001 | Dewan | |
| 2002/0034303 | A1 | 3/2002 | Farris et al. | |
| 2002/0113686 | A1 | 8/2002 | Carravallah | |
| 2002/0140569 | A1 | 10/2002 | van Ee et al. | |
| 2002/0163440 | A1 | 11/2002 | Tsui | |
| 2002/0191794 | A1 | 12/2002 | Farris et al. | |
| 2003/0016139 | A1 | 1/2003 | Teich | |
| 2003/0033540 | A1 | 2/2003 | Fitzgibbon | |
| 2003/0112121 | A1 | 6/2003 | Wilson | |
| 2003/0118187 | A1 | 6/2003 | Fitzgibbon | |
| 2003/0153306 | A1 | 8/2003 | Study et al. | |
| 2003/0197595 | A1 | 10/2003 | Olson et al. | |
| 2003/0216139 | A1 | 11/2003 | Olson et al. | |
| 2004/0017292 | A1 | 1/2004 | Reese et al. | |
| 2004/0066277 | A1 | 4/2004 | Murray et al. | |
| 2004/0100391 | A1 | 5/2004 | Guthrie | |
| 2005/0024184 | A1 | 2/2005 | Chuey | |
| 2005/0024185 | A1 | 2/2005 | Chuey | |
| 2005/0024229 | A1 | 2/2005 | Chuey | |
| 2005/0024230 | A1 | 2/2005 | Chuey | |
| 2005/0024254 | A1 | 2/2005 | Chuey | |
| 2005/0024255 | A1 | 2/2005 | Chuey | |
| 2005/0026601 | A1 | 2/2005 | Chuey | |
| 2005/0026602 | A1 | 2/2005 | Chuey et al. | |
| 2005/0026605 | A1 | 2/2005 | Guthrie et al. | |
| 2005/0046545 | A1 | 3/2005 | Skekloff et al. | |

FOREIGN PATENT DOCUMENTS

| | | | |
|---|---|---|---|
| EP | 1 129 441 | B1 | 9/2001 |
| FR | 2 792 444 | A1 | 10/2000 |
| GB | 2 325 552 | A | 11/1998 |
| WO | WO 99/63308 | A1 | 12/1999 |
| WO | WO 99/64274 | A1 | 12/1999 |
| WO | WO 00/12850 | A1 | 3/2000 |
| WO | WO 00/70577 | A1 | 11/2000 |
| WO | WO 02/080129 | | 10/2002 |
| WO | WO 2004/034352 | A1 | 4/2004 |
| WO | WO 2004/036526 | A2 | 4/2004 |
| WO | WO 2004/043750 | A2 | 5/2004 |
| WO | WO 2004/066514 | A1 | 8/2004 |
| WO | WO 2004/077729 | A2 | 9/2004 |
| WO | WO 2004/104966 | A2 | 12/2004 |
| WO | WO 2005/002080 | A1 | 1/2005 |

OTHER PUBLICATIONS

Skylink Garage Door/Gate Remote Control, Model 39 User's Instructions, Steps for Programming the Transmitter, 2 pages.

International Search Report for PCT/US 2004/005257 mailed Jul. 9, 2004, 3 pages.

International Search Report for PCT/US 03/35641 mailed Mar. 6, 2004, 3 pages.

Marantec America Accessories Listing, Sep. 30, 2002, 3 pages.

Marantec America Products Listing, Sep. 30, 2002, 3 pages.

Marantec America Openers With A Difference Listing, Sep. 30, 2002, 2 pages.

"Marantec Expands Its Line of Radio Controls by Introducing the HomeLink Compatible 315MHz Modular Frequency System," Marantec America News, Sep. 30, 2002, 3 pages.

Photo Modules for PCM Remote Control Systems, Vishay, TSPO22, Document No. 82095, Rev. 4. Mar. 30, 2001, 7 pages.

IP Receiver for High Data Rate PCM at 455 kHz, Visay TSOP7000, Document No. 82147, Rev. 4, Mar. 29, 2001, 7 pages.

Written Opinion for International Patent Application No. PCT/US2004/015886, mailed Dec. 8, 2004, 6 pages.

Letter and Claim Charts from Brooks Kushman P.C. to Mr. Karl Reichenberger mailed Mar. 3, 2011, 9 pages.

Advisory Action for U.S. Appl. No. 10/546,137, dated Nov. 16, 2009.

Applicant's response to Final Office Action for U.S. Appl. No. 10/546,137, submitted Jan. 3, 2011.

Applicant's response to Final Office Action for U.S. Appl. No. 10/546,137, submitted Oct. 21, 2009.

Applicant's response to Final Office Action for U.S. Appl. No. 10/533,919, submitted Feb. 17, 2010.
Applicant's response to Final Office Action for U.S. Appl. No. 10/533,919, submitted Feb. 5, 2009.
Applicant's response to Final Office Action for U.S. Appl. No. 10/546,137, submitted Dec. 22, 2009.
Applicant's response to non-final Office Action for U.S. Appl. No. 10/533,919, submitted Jul. 7, 2009.
Applicant's response to non-final Office Action for U.S. Appl. No. 10/533,919, submitted May 5, 2008.
Applicant's response to non-final Office Action for U.S. Appl. No. 10/546,137, submitted Aug. 11, 2008.
Applicant's response to non-final Office Action for U.S. Appl. No. 10/546,137, submitted Jun. 18, 2010.
Applicant's response to non-final Office Action for U.S. Appl. No. 10/546,137, submitted May 8, 2009.
Office Action for U.S. Appl. No. 10/546,137, dated Mar. 11, 2011.
Advisory Action for U.S. Appl. No. 10/546,137, mail date Jul. 12, 2011, 3 pages.
Amendment and Reply for U.S. Appl. No. 10/546,137, mail date Jun. 13, 2011, 15 pages.
Office Action for U.S. Appl. No. 10/546,137, mail date Oct. 4, 2011, 11 pages.
Office Action for U.S. Appl. No. 10/533,919, mail date Jul. 21, 2011, 8 pages.
Office Action for U.S. Appl. No. 10/533,919, mail date Apr. 9, 2009, 8 pages.
Office Action for U.S. Appl. No. 10/533,919, mail date Aug. 6, 2008, 10 pages.
Office Action for U.S. Appl. No. 10/533,919, mail date Jan. 4, 2008, 8 pages.
Office Action for U.S. Appl. No. 10/533,919, mail date Nov. 17, 2009, 11 pages.
Office Action for U.S. Appl. No. 10/546,137, mail date Dec. 8, 2008, 9 pages.
Office Action for U.S. Appl. No. 10/546,137, mail date Feb. 18, 2010, 4 pages.
Office Action for U.S. Appl. No. 10/546,137, mail date Jul. 21, 2009, 11 pages.
Office Action for U.S. Appl. No. 10/546,137, mail date Mar. 11, 2008, 8 pages.
Office Action for U.S. Appl. No. 10/546,137, mail date Sep. 1, 2010, 9 pages.
Request for Continued Examination for U.S. Appl. No. 10/533,919, mail date Mar. 17, 2010, 4 pages.
Office Action for U.S. Appl. No. 12/898,592, mail date Jun. 13, 2011, 7 pages.

* cited by examiner

SYSTEM AND METHOD FOR TRAINING A TRANSMITTER TO CONTROL A REMOTE CONTROL SYSTEM

CROSS-REFERENCE TO RELATED APPLICATIONS

This application claims the benefit of U.S. Provisional Application No. 60/472,049, filed May 20, 2003. This application is a continuation-in-part of International Application No. PCT/US03/35641, filed Nov. 7, 2003, which claims the benefit of U.S. Provisional Application No. 60/424,989, filed Nov. 8, 2002. This application is a continuation-in-part of International Application No. PCT/US2004/005257, filed Feb. 21, 2004, which claims the benefit of U.S. Provisional Application No. 60/448,993, filed Feb. 21, 2003.

FIELD OF THE INVENTION

The present invention relates to a radio frequency (RF) transmitter and particularly to training a transmitter that transmits a control signal from a vehicle to a remotely controlled device and controlling a remotely controlled device using a transmitter in a vehicle.

BACKGROUND OF THE INVENTION

Electronically operated remote control systems, such as garage door openers, home security systems, home lighting systems, etc. are becoming increasingly common. Such electronic remote control systems typically employ a battery powered portable RF transmitter for transmitting a modulated and encoded RF signal to a receiver located at the remote control system. For example, a garage door opener system may include a receiver located within a home owner's garage. The garage door receiver is tuned to the frequency of its associated portable RF transmitter and demodulates a predetermined code programmed into both the portable transmitter and receiver for operating the garage door.

As an alternative to a portable transmitter, a trainable transceiver (e.g., a remote control transceiver) may be provided in vehicles for use with remote control devices such as garage door openers, gate controllers, alarm controls, home lighting systems, or other remotely controlled devices. FIG. 1 shows a vehicle 10 including a trainable transceiver used to control a remote control system 14. The transceiver (not shown) is mounted within the vehicle 10, inside, for example, a rearview mirror 16. The transceiver learns and stores the modulation scheme (i.e., code format), transmission codes and the particular RF carrier frequency of an OEM (original equipment manufacturer) remote transmitter 12 for use with the remote control system 14. The transceiver is trained using an original remote RF transmitter 12 for the remote control system. The coded RF (or infrared) energy of the transmitter 12 is transmitted as indicated by arrow A to the transceiver mounted in the rearview mirror 16 of vehicle 10. The transceiver receives the encoded transmitted energy, demodulates it and identifies and stores the control code and carrier frequency of the transmitted energy. Once trained to the control code and frequency of the remote transmitter 12, the transceiver can be used to selectively transmit coded RF energy as indicated by arrow T to the remote control system 14 that is responsive to the signal.

To enhance security of remote control devices, many manufacturers have implemented rolling code or cryptographic algorithms in their remote control system original transmitters and receivers to transmit and respond to randomly varying codes. A cryptographic algorithm is used to generate and encrypt a new control code for each transmission of the control signal. Typically, to keep track of which code is to be transmitted or received next, sequential code serial numbers are stored that identify which code was transmitted or received last, such that the next code will have associated therewith the next sequential serial number. To enable a vehicle-installed trainable transceiver to effectively operate in such systems, trainable transceivers have been developed that have the capability of recognizing when a received signal has been originated from a transmitter that generates a code that varies with each transmission in accordance with a cryptographic protocol. When such a variable code is recognized, the trainable transceiver determines which cryptographic protocol or algorithm is used to generate and transmit the next code to which the receiver will respond. Typically the receiver of the remote control system also needs to be trained to recognize and accept the transmitter as a valid transmitter for the remote control system (e.g., the receiver may be trained to recognize a unique transmitter serial number associated with the transmitter as valid). In addition, the receiver and transmitter are typically synchronized to a counter that increments or changes in a predictable way with each button press. The training of the receiver of the remote control system is commonly referred to as the second part of the training process or receiver training. An example of a trainable transceiver configured to learn variable codes as well as methods for synchronizing rolling codes are described in U.S. Pat. No. 5,661,804 herein incorporated by reference.

SUMMARY OF THE INVENTION

In accordance with one embodiment, a method for actuating a remote device having a receiver using an RF transmitter in a vehicle to transmit variable code signals, the RF transmitter including a memory having variable code characteristics associated with a plurality of different remote devices includes initiating an operating sequence to actuate the remote device, generating a plurality of RF carrier signals, each RF carrier signal including variable code characteristics associated with a different remote device from the plurality of different remote devices, and transmitting the plurality of RF carrier signals to the receiver of the remote device in order to remotely actuate the remote device.

In accordance with another embodiment, a method for training a trainable RF transmitter in a vehicle to transmit variable code signals used to actuate a remote device having a receiver, the trainable transmitter having a memory including stored variable code characteristics for a plurality of different remote devices, includes initiating a training sequence, generating at least one RF carrier signal having variable code characteristics associated with one remote device from the plurality of different remote devices, transmitting the at least one RF carrier signal to the receiver of the remote device, repeating the generating and transmitting steps for the variable code characteristics of each remote device in the plurality of different remote devices until feedback is received from a user that the remote device is activated, and upon receiving an indication that the remote device is activated, storing an identifier of the variable code characteristics that activated the remote device.

In accordance with yet another embodiment, a method for training a trainable RF transmitter in a vehicle to transmit variable code signals used to actuate remote devices, the trainable transmitter including a memory having stored variable code characteristics for a plurality of different remote devices, includes receiving inputs from a user, identifying a remote device to be actuated from the plurality of different remote devices based on the received inputs, and associating the identified remote device with a user input device of the trainable transmitter for subsequent transmission of a variable code signal having variable code characteristics of the identified remote device to actuate the identified remote device.

In accordance with another embodiment, a method for training a trainable RF transmitter in a vehicle to transmit variable code signals used to actuate remote devices, the trainable transmitter including a memory having stored variable code characteristics for a plurality of different remote devices includes receiving inputs from a user, identifying a remote device to be actuated from the plurality of different remote devices based on the received inputs, generating an RF carrier signal having variable code characteristics of the identified remote device, and transmitting the RF carrier signal to a receiver of the identified remote device to actuate the identified remote device.

In accordance with a further embodiment, a trainable transmitter in a vehicle for transmitting variable code signals used to actuate remote devices includes a memory having stored variable code characteristics for a plurality of different remote devices, a user input device configured to receive inputs from a user, a control circuit coupled to the user input device and the memory and configured to receive the inputs from the user input device, to identify a remote device from the plurality of different remote devices based on the received inputs and to associate the identified remote device with the user input device for subsequent transmission of a variable code signal having variable code characteristics of the identified remote device, and a transmitter circuit coupled to the control circuit and configured to transmit the variable code signal to actuate the identified remote device.

BRIEF DESCRIPTION OF THE DRAWINGS

The invention will be more readily understood by reference to the following description taken with the accompanying drawings, in which.

DETAILED DESCRIPTION OF THE PREFERRED AND OTHER EXEMPLARY EMBODIMENTS

Figure 1:
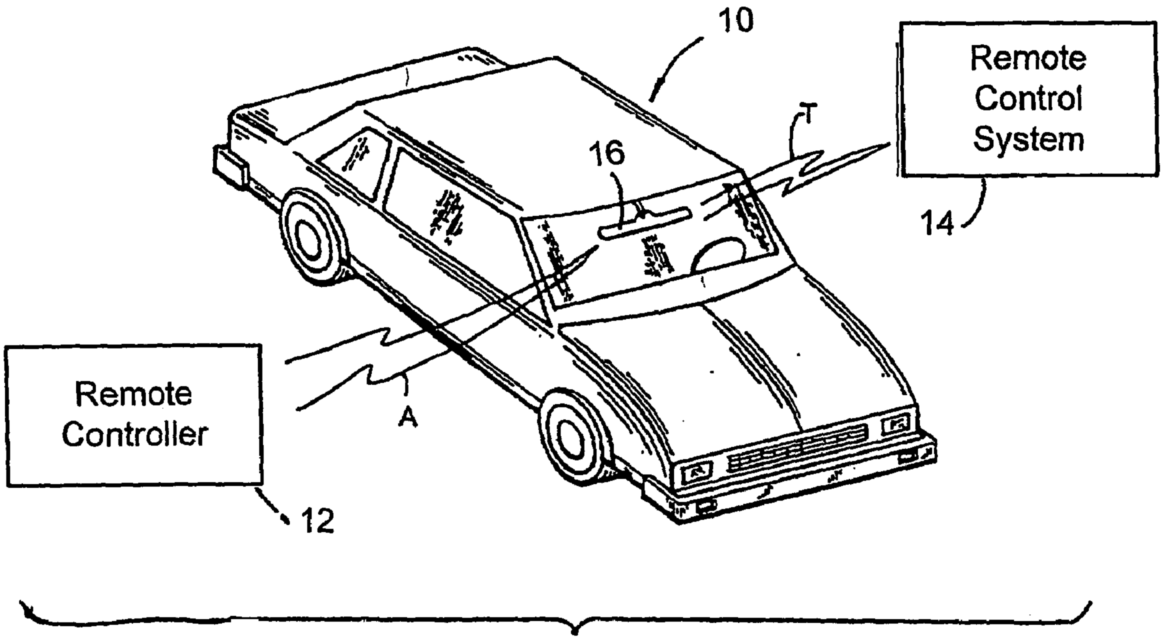
FIG. 1 PRIOR ART
FIG. 1 shows a vehicle including a trainable transceiver used to control a remote control system.
Figure 2:
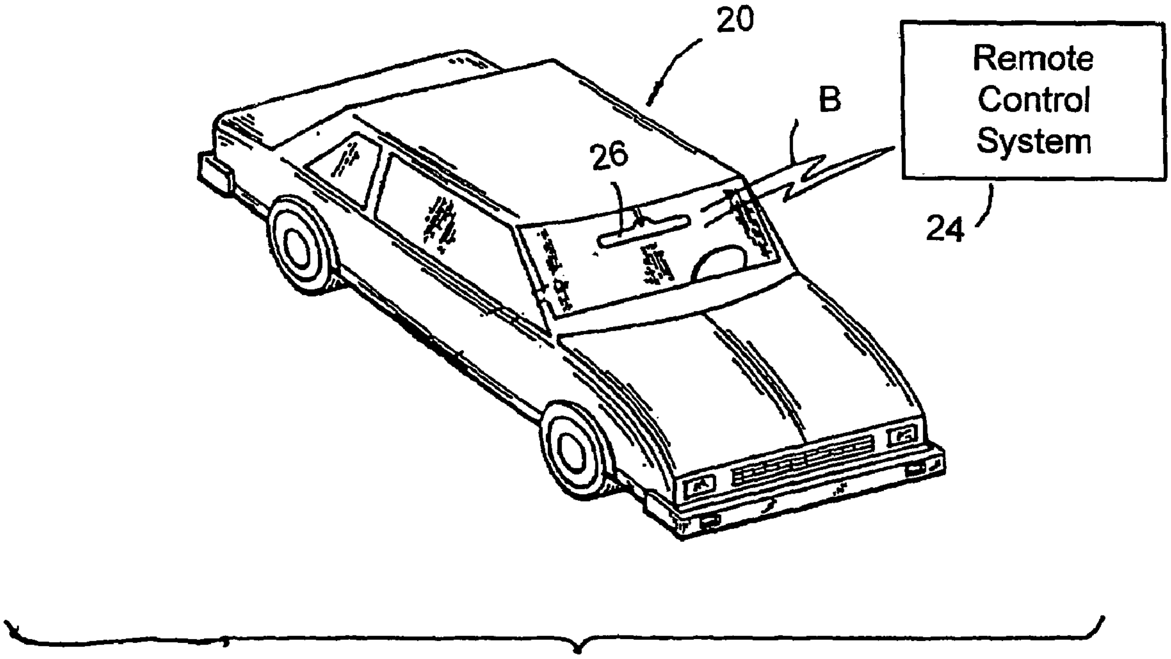
FIG. 2 shows a vehicle including a trainable transmitter in accordance with an embodiment.

FIG. 2 shows a vehicle 20 including a trainable transmitter in accordance with an embodiment. Vehicle 20 is an automobile, although it should be understood that the trainable transmitter of the present invention may be embodied in other vehicles (e.g., a truck, sport utility vehicle (SUV), mini-van, or other vehicle) or other systems. The system as illustrated in FIG. 2 also includes a remote control system 24 such as a garage door opener, home security system, home lighting system, gate opener, etc. Remote control system 24 is responsive to a variable code (or rolling code) RF control signal. Accordingly, a cryptographic algorithm or protocol is used to generate a new control code for each transmission of the control signal. The trainable transmitter 35 (shown in FIG. 3) is mounted within the vehicle 20 inside, for example, a rearview mirror 26 or other suitable location such as an overhead console, a visor, etc. Alternatively, one or more elements of trainable transmitter may be mounted to other vehicle interior elements, such as an instrument panel or visor. Trainable transmitter 35 (shown in FIG. 3) also includes a programmable control circuit coupled to a transmitter circuit. The transmitter circuit and programmable control circuit are configured to identify, retrieve and/or store the carrier frequency and the cryptographic or rolling code algorithm or protocol for the variable control code used to control the remote control system 24. The transmitter selectively generates coded RF energy in accordance with the cryptographic protocol and transmits the coded RF energy as indicated by arrow B to the remote control system 24. Remote control system 24 includes a receiver 37 (shown in FIG. 3) to receive the transmitted RF energy. The programmable control circuit also controls the transmitter circuit 30 (shown in FIG. 3) to generate a carrier signal and modulate a binary code onto the carrier signal to generate the control signal for the remote control system 24. The operation of the trainable transmitter and the programmable control circuit are described in further detail below.

Figure 3:
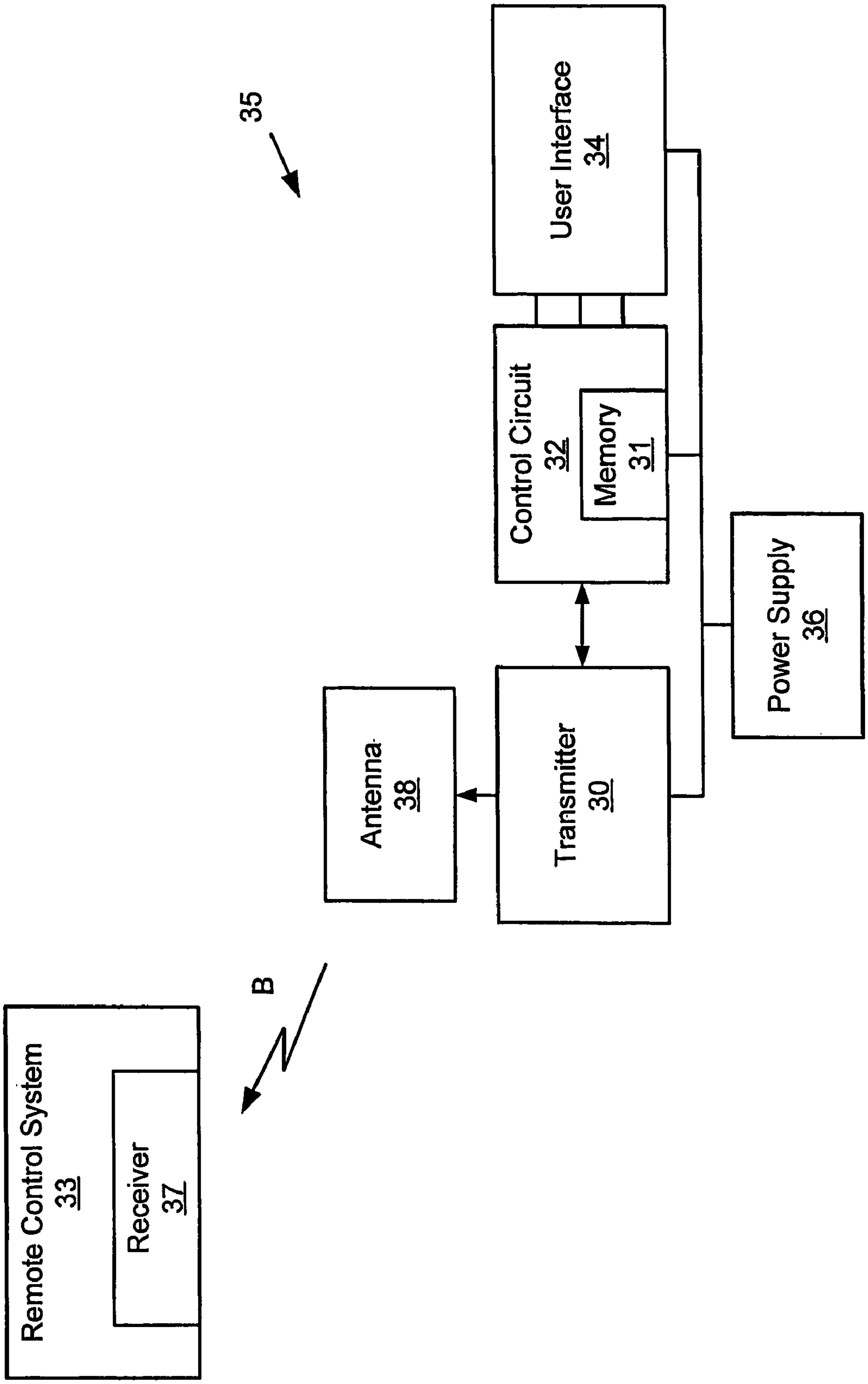
FIG. 3 is a schematic block diagram of a trainable transmitter in accordance with an embodiment.

FIG. 3 is a schematic block diagram of a trainable transmitter in accordance with an embodiment. Trainable transmitter 35 shown in FIG. 3 includes a transmitter circuit 30, that is coupled to an antenna 38 and a control circuit 32. Advantageously, trainable transmitter 35 does not require a receiver to be trained to operate a remote control system 33. Accordingly, an original transmitter of the remote control system is also not required to train transmitter 35. A power supply 36 is conventionally coupled to the various components for supplying their necessary operating power in a conventional manner. A user interface 34 is used to receive input from a user regarding a particular remote system to be controlled. Transmitter 35 may be used to control a plurality of systems and devices. For example, user interface 34 may include an operator input device such as a series of push button switches which may each be associated with a separate remote control system, such as different garage doors, electronically operated access gates, house lighting controls or other remote control systems, each of which may have its own unique operating RF frequency, modulation scheme and/or cryptographic algorithm or protocol for a control code. Thus, each switch may correspond to a different radio frequency channel for transmitter circuit 30. Alternatively, the series of push button switches may each be associated with a different type of remote control system such as garage door opener, gate controller, house lighting control, each of which may have an associated set of manufacturers, makes, models, etc. Each manufacturer and/or specific make or model of system may have a unique operating frequency or frequencies, encryption data, cryptographic algorithm or protocol, etc. In another embodiment, user interface 34 may also include a display (or be coupled to a vehicle mounted electronic display) with a menu identifying, for example, particular remote control systems or types of remote control systems.

Trainable transmitter 35 includes a control circuit 32 configured to control the various portions of transmitter 35, to store data in a memory 31, to operate preprogrammed functionality, etc. Control circuit 32 may include various types of control circuitry, digital and/or analog, and may include a microprocessor, microcontroller, application-specific integrated circuit (ASIC), or other circuitry configured to perform various input/output, control, analysis, and other functions as described herein. Control circuit i32 is coupled to user interface 34 which may include an operator input device which includes one or more push button switches, but may alternatively include other user input devices, such as switches, knobs, dials, etc., or even a voice-actuated input control circuit configured to receive voice signals from a vehicle occupant and to provide such signals to control circuit 32 for control of transmitter 35.

Transmitter 35 is used to control remote control system 33 that uses a rolling control code. Once transmitter circuit 30 and control circuit 32 are trained to the carrier frequency and cryptographic algorithm associated with the remote control system 33 (e.g., a garage door opener), transmitter circuit 30 may then be used to transmit an RF signal B that has the characteristics necessary to activate remote control system 33 to a receiver 37 located at the remote control system 33.

Control circuit 32 includes data input terminals for receiving signals from the user interface 34 indicating, for example, that a training mode should be initiated, that an operating mode should be initiated, or for receiving information regarding the remote control system 33, etc. The training mode or operating mode may be initiated by, for example, actuating a push button, by a message on a vehicle bus (if the transceiver is mounted in a vehicle), a combination of key presses, selecting a menu item on a display, etc. The training and operating processes are is discussed in further detail below with respect to FIGS. 4-8. Control circuit 32 also includes a memory 31 that includes stored variable code characteristics for a plurality of remote control system manufacturers and particular makes or models of remote control systems for each manufacturer. The variable code characteristics may include, for example, possible carrier frequencies, modulation schemes, encryption data, cryptographic algorithms or protocols etc. for each system manufacturer and/or for specific makes or models of a system. Preferably, each system for a particular manufacturer has an entry in memory 31. In one embodiment, an index number may be provided for each system that identifies the system and the location of its entry in memory 31. Memory 31 may be a volatile or non-volatile memory, and may include read only memory (ROM), random access memory (RAM), flash memory, or other memory types.

Control circuit 32 is also coupled to transmitter circuit 30. Transmitter circuit 30 is configured to communicate with receiver 37 of the remote control system and may be used to transmit signals via antenna 38. In an alternative embodiment, trainable transmitter 35 may include a plurality of transmitter circuits 30 and/or antennas 38 in order to transmit multiple signals at multiple frequencies. Once transmitter 35 has been trained, receiver 37 of the remote control system 33 is synchronized with transmitter circuit 30 regarding the variable control code (and its associated serial number) generated using the cryptographic algorithm that was either received last or that is expected to be transmitted next. The receiver is also trained to recognize and accept transmitter 35 as a valid transmitter and synchronize a rolling code counter(s).

Figure 4:
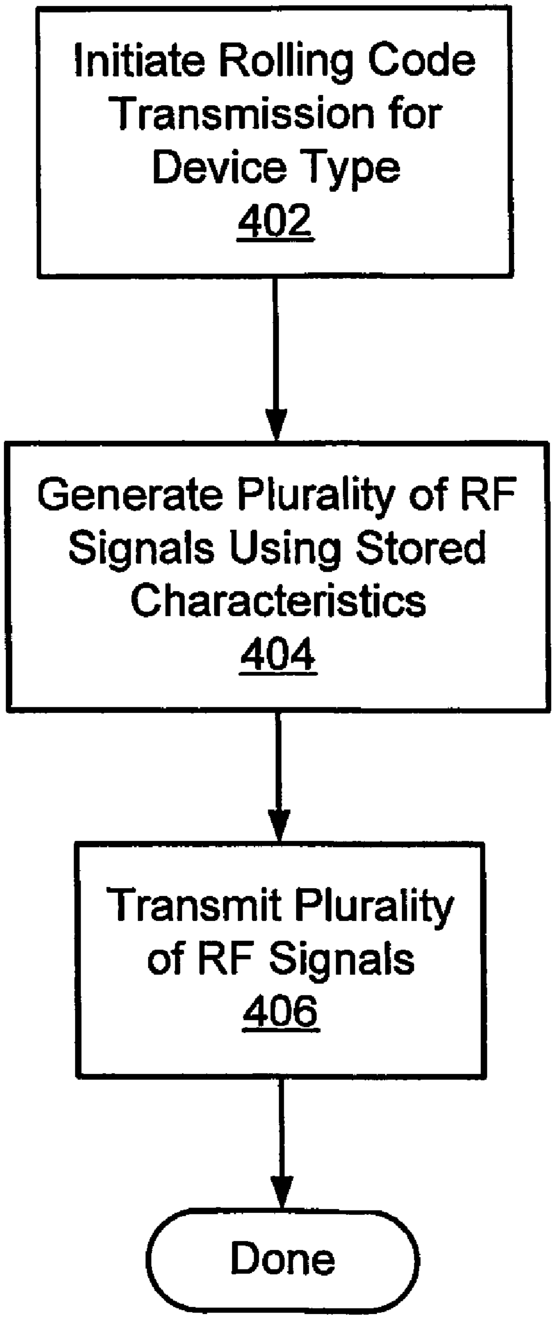
FIG. 4 illustrates a method for using a transmitter to remotely actuate a device in accordance with an embodiment.

FIG. 4 illustrates a method for using a transmitter to remotely actuate a device in accordance with an embodiment. At block 402, an operating mode is initiated to transmit rolling code signals for a particular device type. For example, if the remote control system to be controlled is a garage door opener, the user may initiate the transmission of rolling codes associated with various garage door opener manufacturers and systems as stored in the memory 31 of the control circuit 32. Alternatively, the operating mode may be configured to transmit rolling code signals for all known rolling code protocols for all known systems stored in memory 31. The rolling code transmission process may be initiated by, for example, actuating a push button, by a message on a vehicle bus (if the transceiver is mounted in a vehicle), a combination of key presses, selecting a menu item on a display, etc. At block 404, a plurality of RF carrier signals are generated by the control circuit 32. Each RF signal has the variable code characteristics (e.g., control code according to a cryptographic algorithm, carrier frequency, etc.) for a different one of the systems stored in the memory of the control circuit including the particular device to be actuated. At block 406, the plurality of RF signals are transmitted to the receiver of the remote control system. In one embodiment, the plurality of RF signals are transmitted sequentially. The transmitter 35 (shone in FIG. 3) will cycle through each known rolling code protocol (e.g, for a particular type of remote control system or for all known systems) stored in memory at each activation. If the remote control system corresponds to one of the system for which characteristics are stored in the transmitter, the remote control system should be actuated by the transmission of signals for all possible systems stored in the memory of the transmitter. Accordingly, the particular remote control system and its associated variable code characteristics do not need to be identified by the transmitter. At each activation of the rolling code transmission process, control circuit 32 (shown in FIG. 3) will increment each rolling code value unique to rolling code protocol. As mentioned, the receiver of the remote control system should be trained to accept the transmitter as a valid transmitter.

Figure 5A:
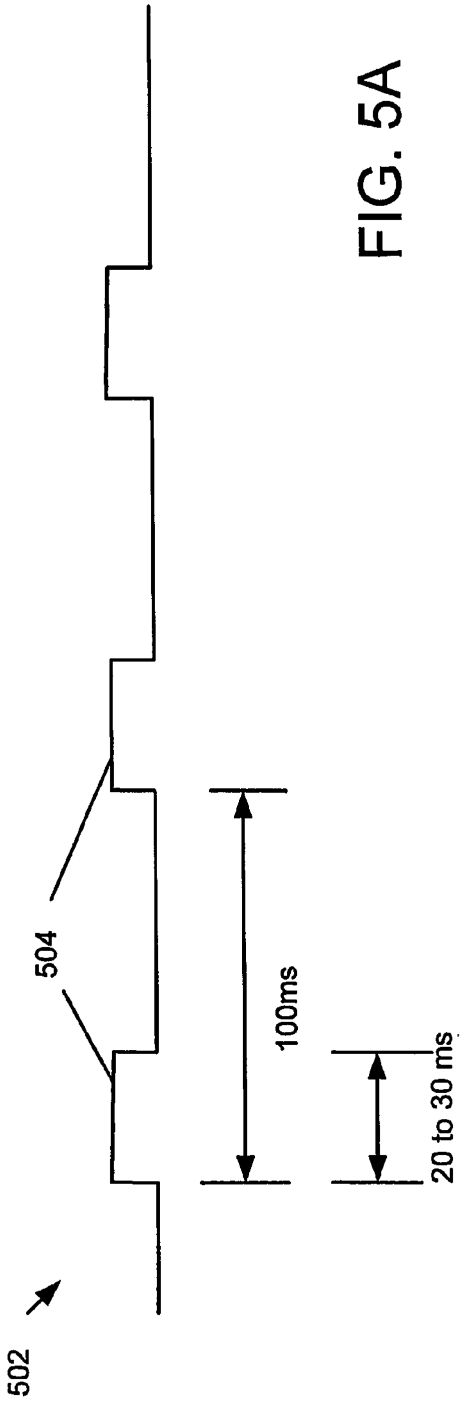
FIGS. 5A and 5B illustrate interleaving of messages in accordance with an embodiment.
Figure 5B:
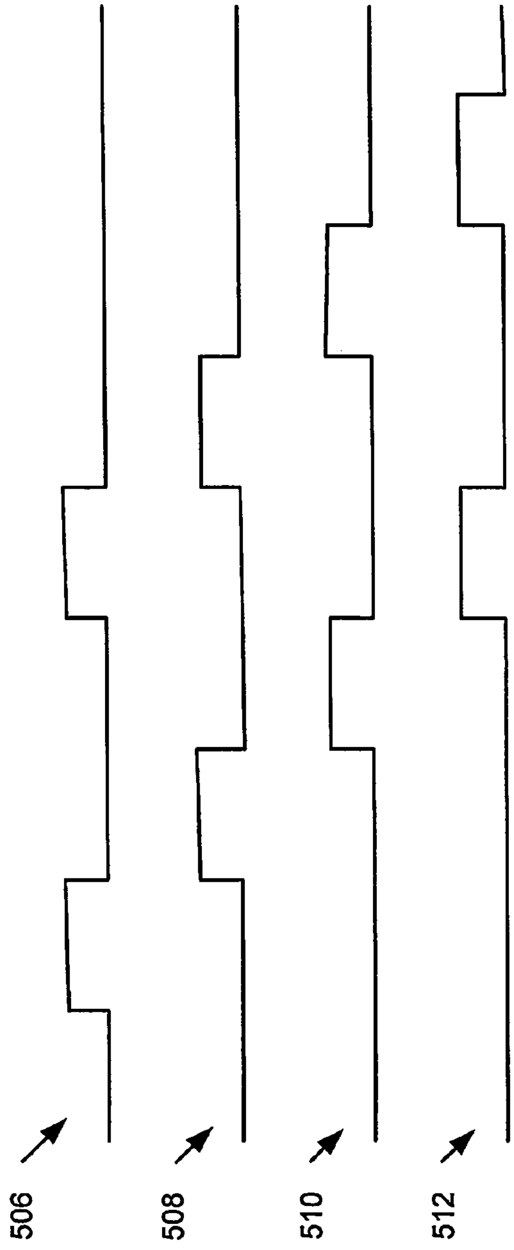

In another embodiment, an RF signal for each system stored in memory may be transmitted simultaneously. In this embodiment, a separate transmitter circuit 30 (shown in FIG. 3) may be required to transmit each RF signal. Accordingly, as mentioned above, transmitter 35 (shown in FIG. 3) may include a plurality of transmitter circuits 30. In another alternative embodiment, the data packets of the plurality of signals are transmitted simultaneously using a single transmitter circuit 30. Referring to FIG. 5A, each transmission of a message 502 by transmitter circuit 30 includes a packet of data 504 followed by idle time. For example, a typical transmission packet 504 may be 20 to 30 ms in duration, followed by approximately 75 ms of idle time. Each packet 504 contains a plurality of bits. By switching between frequencies and/or data packet transmissions, multiple message, for example four messages, can be interleaved while appearing continuous to the remote control system receiver and the user. The actual number of messages that may be interleaved may vary based on the contents of the transmission. As shown in FIG. 5B, multiple messages (506-512) can be sent on different frequencies. A first data string (or message) 506 is sent on a first frequency, a second data string 508 is sent on a second frequency, a third data string 510 is sent on a third frequency and a fourth data string 512 is sent on a fourth frequency. Each data string corresponds to a unique system. Each frequency may be the same or different, depending on the system to which it corresponds. The number of messages (or data packets) that may be sent in this manner, however, may be limited by the duration and format of a transmission by the transmitter.

At each activation, the transmitter cycles through the various rolling code protocols in memory and generates an interleaved message(s). Depending on the number of rolling code protocols or systems stored in memory, more than one interleaved message may be required (i.e., each message will represent a subset of the protocols/systems in memory). As mentioned above, if the remote control system corresponds to one of the systems for which characteristics are stored in the transmitter, the remote control system should be actuated by the transmission of signals for all possible systems (e.g., simultaneously). Accordingly, the remote control system and its associated variable code characteristics (e.g., rolling code protocol) do not need to be identified by the transmitter. Each time the rolling code transmission process is initiated, the rolling code value unique to each system is incremented. As mentioned above, the receiver 37 (see FIG. 3) of the remote control system should be trained to accept the transmitter as a valid transmitter.

Figure 6:
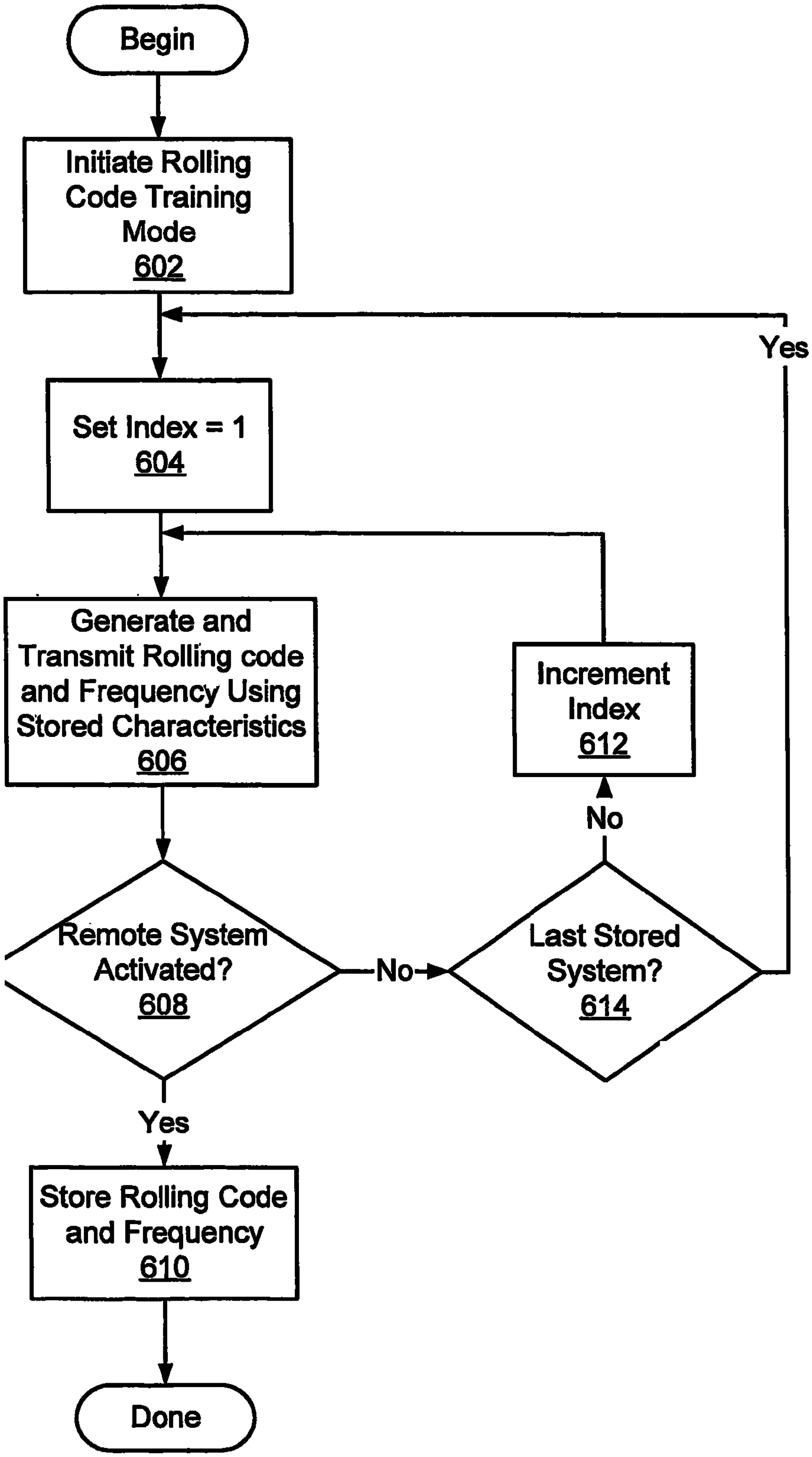
FIG. 6 illustrates a method for training a trainable transmitter in accordance with an embodiment.

FIG. 6 illustrates a method for training a trainable transmitter in accordance with one embodiment. At block 602, a rolling code training mode is initiated to identify the remote control system and the correct frequency and variable control code for the remote control system. The training mode may be initiated by, for example, actuating a push button, by a message on a vehicle bus (if the transceiver is mounted in a vehicle), a combination of key presses, selecting a menu item on a display, etc. At block 604, an index counter is set to one. As discussed previously, each system in memory may be identified by, for example, an index number. Accordingly, the training process begins with the system and its associated characteristics identified by an index number of one. As the process proceeds, each of the stored systems will be tried based on the sequential order of the corresponding index numbers in memory. At block 606, an RF control signal is generated using the stored characteristics, e.g., rolling code and frequency, for the first system in memory and transmitted to the remote control system. The transmitter waits for user feedback regarding whether the remote system was activated by the transmission at block 608. A user may provide feedback by, for example, actuating a push button, releasing a push button, a combination of button presses, a menu selection, a time period between button presses, etc. If the remote control system is activated (block 608), the rolling code characteristics used are stored at block 610 and may be associated with a switch or other operator input device of the transmitter. The switch is also associated with the remote control system and may be used to initiate subsequent transmissions to the remote control system. As mentioned above, the receiver 37 (see FIG. 3) of the remote control system should be trained to accept the transmitter as a valid transmitter.

If the remote control system is not activated (block 608), it is determined whether the last stored system in memory has been reached at block 614. If the last stored system has not been reached, the index counter is incremented at block 612. The system and characteristics identified by the incremented index number in memory are used to generate an RF control signal transmitted to the remote control system (block 606). The process is repeated for each system stored in memory until either the remote system is activated or all possible systems have been tried. If, at block 614, the last stored system has been reached and the remote system has not been activated, the process may start over at block 604.

Figure 7:
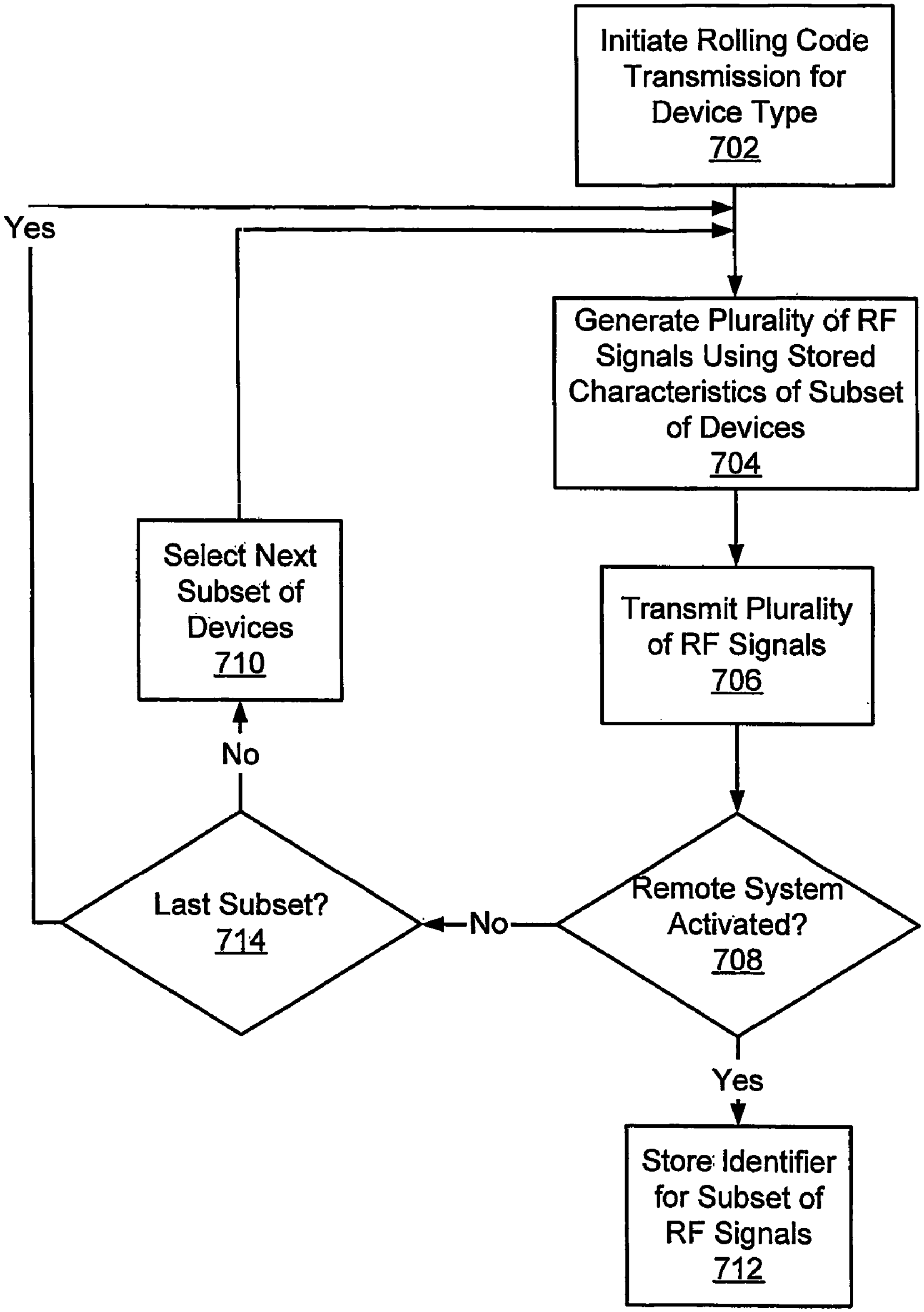
FIG. 7 illustrates a method for training a trainable transmitter in accordance with an alternative embodiment.

FIG. 7 illustrates a method for training a trainable transmitter in accordance with an alternative embodiment. At block 702, a rolling code training mode is initiated. The training mode may be initiated by, for example, actuating a push button, by a message on a vehicle bus (if the transceiver is mounted in a vehicle), a combination of key presses, selecting a menu item on a display, etc. At block 704, a plurality of RF signals corresponding to a subset of the systems or devices included in the memory is generated by the control circuit. The subset of signals may be transmitted, for example, sequentially or simultaneously (e.g., via multiple transmitter circuits or an interleaved message). The transmitter may then send a transmission with a set of packets representing the subset of all possible systems at block 706. At block 708, the transmitter waits for user feedback regarding whether the remote system was activated by the transmission at block 706. A user may provide feedback by, for example, actuating or releasing a push button, a combination of key presses, a menu selection, a time period between button presses, etc. If the remote control system is activated, the subset of systems used may be stored and associated with a switch or button for subsequent transmission to the remote control system at block 712. As mentioned above, the receiver 37 (see FIG. 3) of the remote control system should be trained to accept the transmitter as a valid transmitter. If the transmission does not activate the remote control system or device, it is determined whether the last subset of systems in memory has been reached at block 714. If the last subset of systems has not been reached, another subset of possible systems from the memory are used to generate a plurality of RF signals at block 710. Each time the rolling code transmission process is initiated, the rolling code value unique to each system in the identified subset of systems is incremented. This process continues until the system is activated or all possible systems have been tried. If, at block 714, the last subset of systems has been reached and the remote system has not been activated, the process may start over at block 704.

Figure 8A:
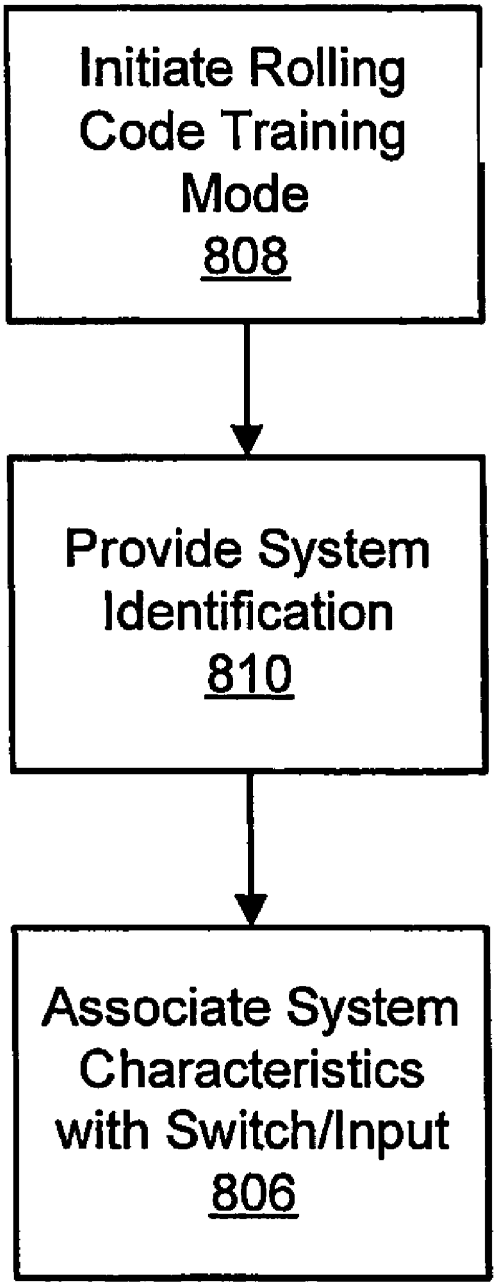
FIGS. 8*a* and 8*b* illustrates methods for training a trainable transceiver in accordance with an alternative embodiments.

FIG. 8*a* illustrates a method for training a trainable transmitter in accordance with an alternative embodiment of the invention. At block 802, a rolling code training mode is initiated to identify the remote control system and the correct frequency and variable control code for the remote control system. The training mode may be initiated by, for example, actuating a push button, by a message on a vehicle bus (if the transceiver is mounted in a vehicle), a combination of key presses, selecting a menu item on a display, etc. At block 804, a user provides input to the transmitter and control circuit that identifies the remote control system (e.g., manufacturer, make/model, etc.) to be controlled. For example, the transmitter user interface may include a display or be coupled to a display in the vehicle that can be used to show a menu of possible remote control systems (i.e., systems that have characteristics stored in the memory of the transmitter). The user may select from the menu the appropriate system that corresponds to the remote control system to be controlled by the transmitter. Alternatively, a menu of the possible systems that have characteristics stored in the memory of the transmitter may be provided in a written document, such as an owner's manual, and the user can select a system by a combination of key or button presses. Once the control circuit of the transmitter receives the system identification, the system and/or variable code characteristics for the identified system may be associated with a switch or button at block 806 for subsequent transmission to the remote control system. As mentioned above, the receiver 37 (see FIG. 3) of the remote control system should be trained to accept the transmitter as a valid transmitter.

Figure 8B:
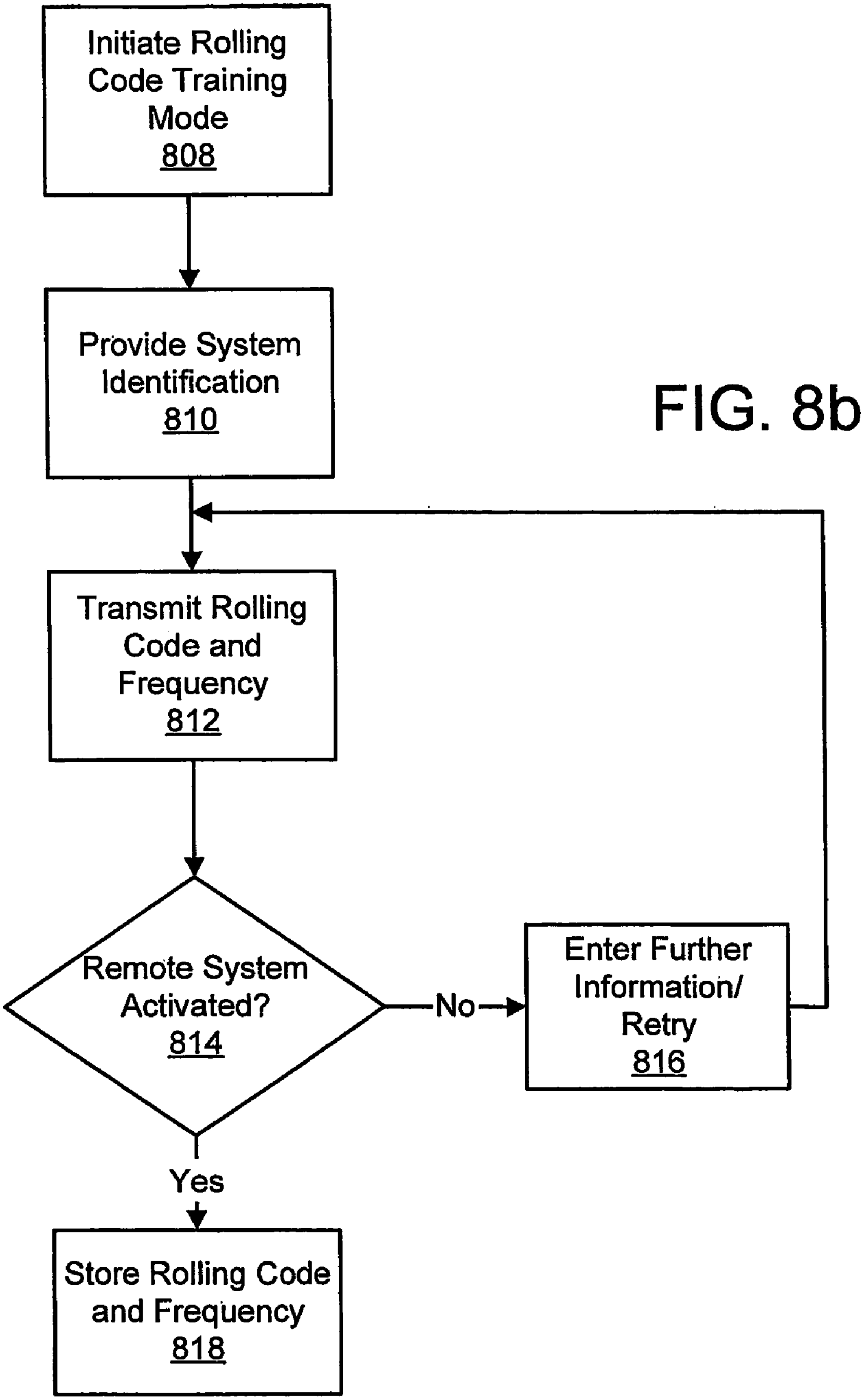

FIG. 8*b* illustrates a method for training a trainable transmitter in accordance with an alternative embodiment of the invention. At blocks 808 and 810, a rolling code training mode is initiated and a user provides an input to the transmitter and control circuit to identify the remote control system to be controlled in a manner similar to that described above with respect of FIG. 8*a*. In the embodiment of FIG. 8*b*, once the control circuit of the transmitter receives the system identification, the variable code characteristics for the system are retrieved and the rolling code and frequency are used to create a RF control signal that is transmitted to the remote control system at block 812. The transmitter waits for user feedback regarding whether the remote system was activated by the transmission at block 814. A user may provide feedback by, for example, actuating a push button, a combination of button presses, a menu selection, a time period between button presses, etc. If the remote control system is activated (block 814), the rolling code characteristics used are stored at block 818 and associated with a switch or other input device of the transmitter. The switch or other input device is also associated with the remote control system and may be used to initiate subsequent transmissions to the remote control system. If the remote control system is not activated (block 814), the transmitter may prompt the user to reenter or reselect the system or to provide additional input regarding the remote control system at block 816. The transmitter may then re-transmit an RF control signal (block 8812) to the remote control system. As mentioned above, the receiver 37 (see FIG. 3) of the remote control system should be trained to accept the transmitter as a valid transmitter.

It is also important to note that the construction and arrangement of the elements of the trainable transmitter as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, circuit elements, etc.) without materially departing from the novel teachings and advantages of the subject matter recited herein. Accordingly, all such modifications are intended to be included within the scope of the present invention as described herein. The order or sequence of any process or method steps may be varied or re-sequenced according to alternative embodiments. Other substitutions, modifications, changes and/or omissions may be made in the design, operating conditions and arrangement of the preferred and other exemplary embodiments without departing from the exemplary embodiments of the present invention as expressed herein.

What is claimed is:

1. A method for actuating a remote device having a receiver using an RF transmitter in a vehicle to transmit variable code signals, the RF transmitter including a memory having variable code characteristics associated with a plurality of different remote device types, the method comprising:

initiating an operating sequence to actuate the remote device;

generating a plurality of variable code messages for a plurality of device types using the variable code characteristics;

interleaving the plurality of variable code messages to create interleaved data; and transmitting the interleaved data.

2. A method according to claim 1, wherein transmitting the interleaved data comprises simultaneously transmitting each of the plurality of variable code messages at a different frequency.

3. A method according to claim 2, wherein interleaving the plurality of variable code messages comprising dispersing packets of each variable code message over a period of time.

4. A method according to claim 1, wherein the interleaved data is transmitted at a single frequency.

5. A method according to claim 1, wherein the plurality of RF carrier signals are generated and transmitted at each initiation of the operating sequence.

* * * * *